Dec. 15, 1964 G. A. VISSER 3,161,553
METHOD OF MAKING A REINFORCED SEMI-RIGID STRUCTURE
Filed Dec. 14, 1959 5 Sheets-Sheet 1

INVENTOR.
GERRIT A. VISSER
BY
*Jack W. Wicks*
ATTORNEY

INVENTOR.
GERRIT A. VISSER
BY
*Jack W. Wicks*
ATTORNEY

Dec. 15, 1964 G. A. VISSER 3,161,553
METHOD OF MAKING A REINFORCED SEMI-RIGID STRUCTURE
Filed Dec. 14, 1959 5 Sheets-Sheet 3
FIG. 9
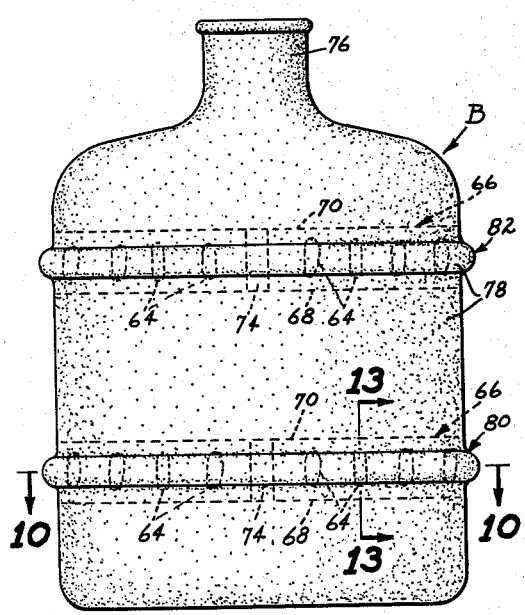
FIG. 10
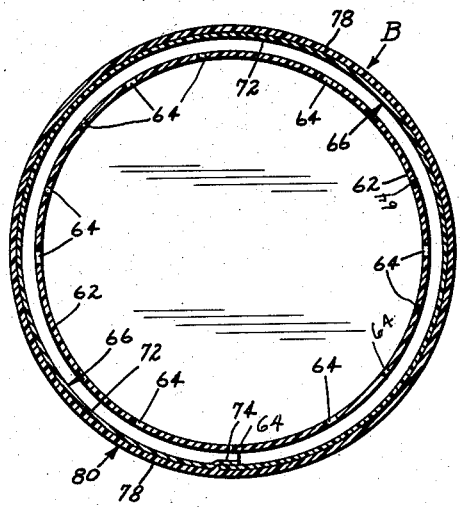
FIG. 11 FIG. 12 FIG. 13
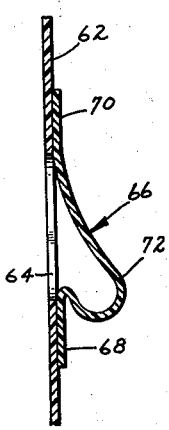 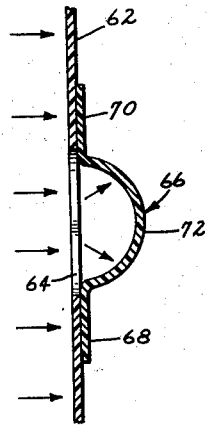 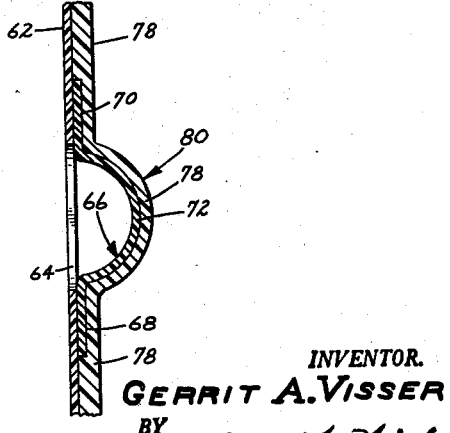
INVENTOR.
GERRIT A. VISSER
BY
Jack W. Wicks
ATTORNEY Dec. 15, 1964  G. A. VISSER  3,161,553
METHOD OF MAKING A REINFORCED SEMI-RIGID STRUCTURE
Filed Dec. 14, 1959  5 Sheets-Sheet 4
INVENTOR.
GERRIT A. VISSER
BY
ATTORNEY
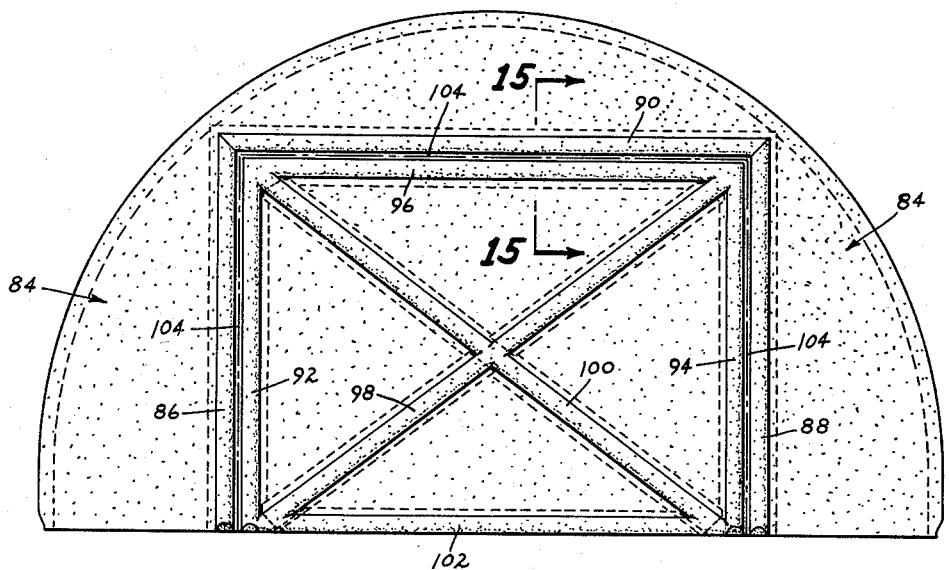
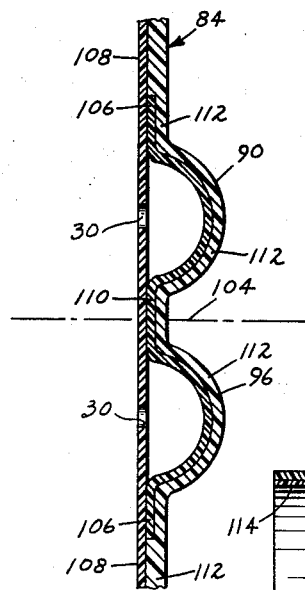
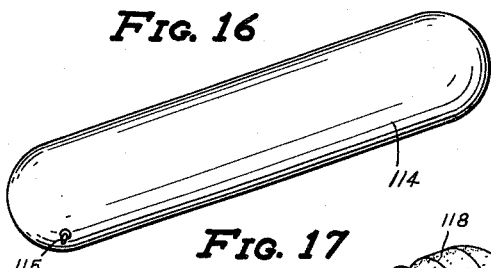
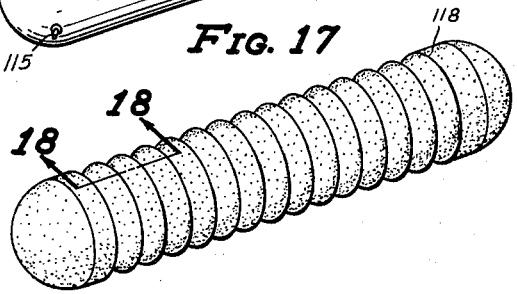
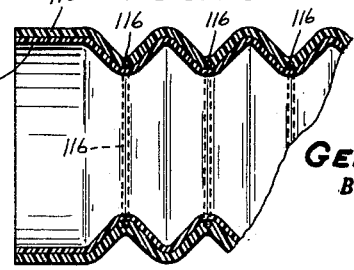

Dec. 15, 1964 G. A. VISSER 3,161,553
METHOD OF MAKING A REINFORCED SEMI-RIGID STRUCTURE
Filed Dec. 14, 1959 5 Sheets-Sheet 5
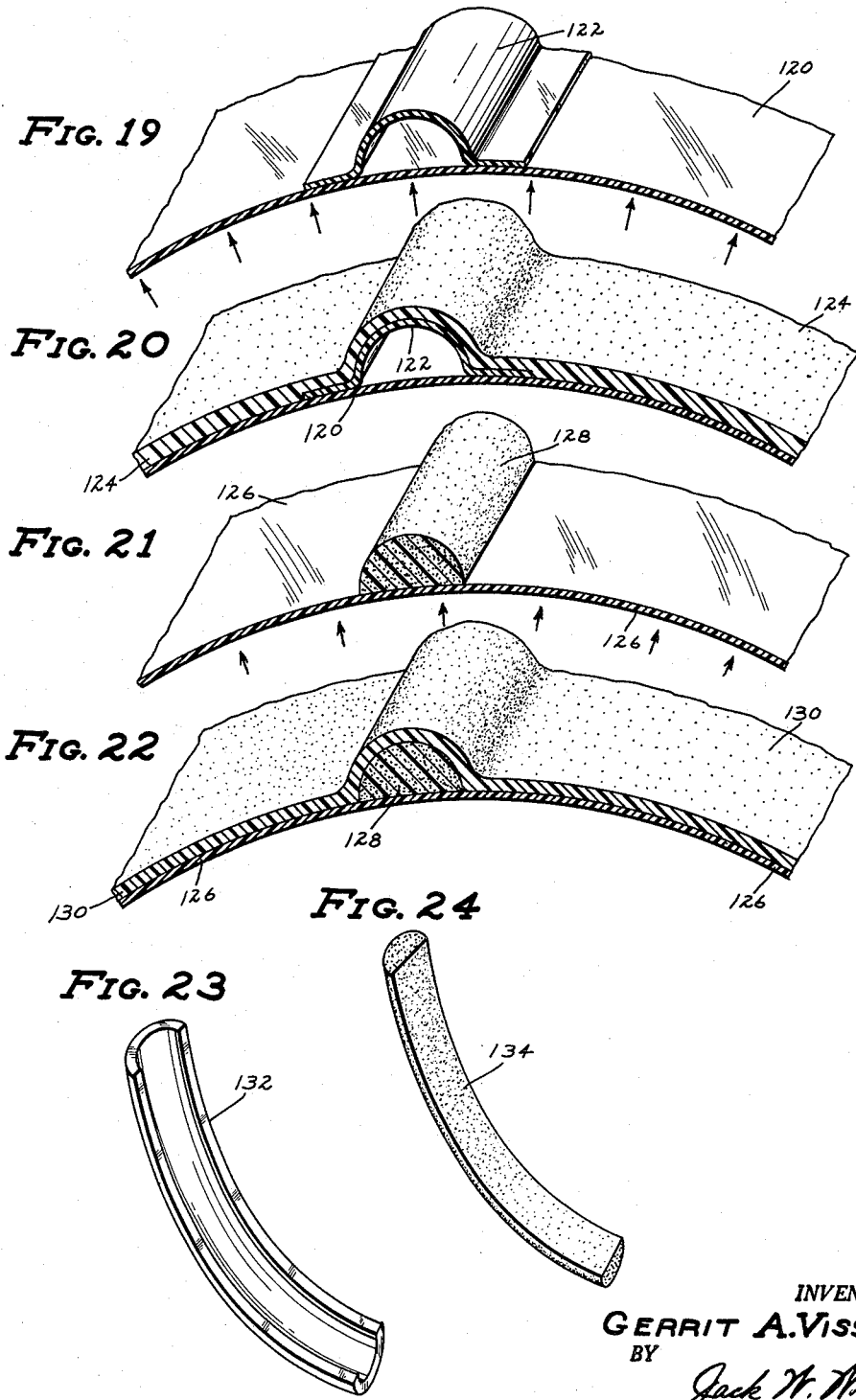
INVENTOR.
GERRIT A. VISSER
BY
Jack W. Wicks
ATTORNEY

United States Patent Office 3,161,553
Patented Dec. 15, 1964

3,161,553
METHOD OF MAKING A REINFORCED
SEMI-RIGID STRUCTURE
Gerrit A. Visser, Wayzata, Minn., assignor to Space
Structures, Inc., Chanhassen, Minn.
Filed Dec. 14, 1959, Ser. No. 859,380
5 Claims. (Cl. 156—156)

My invention relates to an improvement in structure as applied to buildings, containers, supporting members and the like, more particularly to the formation of a semi-rigid structure and in detail to the reinforcement thereof.

In producing the structural formation disclosed in pending application Serial No. 837,383, filed September 1, 1959, now abandoned, size and economy of construction material dictates the need in many instances, for reinforcement. It is to such need, and with regard to the structure disclosed herein, and other structure that this invention is directed.

It is an object of my invention to provide a reinforced semi-rigid structural member and the method of making the same, the structure in one form including a base form made of thin flexible material and having secured thereto a channel-shaped form also of thin flexible material, both forms held in open extended formation and then covered with a self-hardening composition which when hardened produces an integrally reinforced semi-rigid structure.

It is further object of this invention to provide a portion of a semi-rigid structure with an integral reinforcement as outlined above in the form of an outline of a window. Then removing the portion of the structure within the reinforced outline thereby producing a window opening reinforced at its edges in which a window may be mounted and supported.

It is also an object of my invention to provide the structural member heretofore mentioned with parallel reinforcement means mentioned in close spaced relation, the same being formed with the formation of the structure in the general outline of a door whereby a cut may be made in the space between the parallel spaced reinforcement means thereby forming a reinforced door or the like and jam simultaneously. With simple conventional hinging, the door or the like thus cut, may be used with the structure. It is a still further object to provide reinforcement means which house wiring and pipes for heating and gas.

It is an object of my invention to provide the above mentioned reinforcement means economically, simply, in an absolute minimal of time, as an integral part of the structure, and formed simultaneously with the formation of the structure.

I shall not here attempt to set forth and indicate all of the various objects and advantages incident to my invention, but other objects and advantages will be referred to in or else will become apparent from that which follows.

The invention will appear more clearly from the following detailed description when taken in connection with the accompanying drawings, showing by way of examples embodiments of the inventive idea wherein like numerals refer to like parts throughout.

In the drawings forming part of this application:

FIGURE 7 is an enlarged sectional view on the line 7—7 of FIGURE 1.

FIGURE 8 is an enlarged fragmentary top plan view of the structure shown in FIGURE 7.

FIGURE 9 is a side view of a container formed with reinforcing portions according to my invention.

FIGURE 10 is a sectional view on the line 10—10 of FIGURE 9.

FIGURE 11 shows the base form and reinforcement member attached thereto in limp form as the first step in the formation of the container and the reinforcement of FIGURE 9.

FIGURE 12 is a view of that shown in FIGURE 11 in inflated supported condition.

FIGURE 13 is a section on the line 13—13 of FIGURE 9 showing the structure formation of FIGURES 11 and 12 in finished form.

FIGURE 14 is a front view of the end of an enclosure having reinforced portions made according to my invention and from which a door is cut and with which it is used, the broken line showing where the cut is made to finally form the door.

FIGURE 15 is an enlarged section on the line 15—15 of FIGURE 14.

FIGURE 16 is a perspective view of a further embodiment of the invention showing the base form.

FIGURE 17 is a perspective view of a further embodiment of the invention using the form shown in FIGURE 16.

FIGURE 18 is a sectional view on the line 18—18 of FIGURE 17.

FIGURE 19 is a perspective view of a further embodiment of the invention showing a portion of a base form having a preformed reinforcement member secured thereto as the first step in forming the reinforced structure.

FIGURE 20 is a perspective view of that shown in FIGURE 19 with the rigidifying material applied thereon as the second step thereby completing the reinforced structure.

FIGURE 21 is a perspective view illustrating another embodiment of the invention showing a portion of a base form having a preformed reinforcement member secured thereto as the first step in forming the reinforced structure.

FIGURE 22 is a perspective view of that shown in FIGURE 21 with the rigidifying material applied thereon as the second step in forming the reinforced structure.

FIGURE 23 is a perspective view of a mold for a preformed rib.

FIGURE 24 is a perspective view of a rib portion formed in the mold of FIGURE 23.

Figure 1:
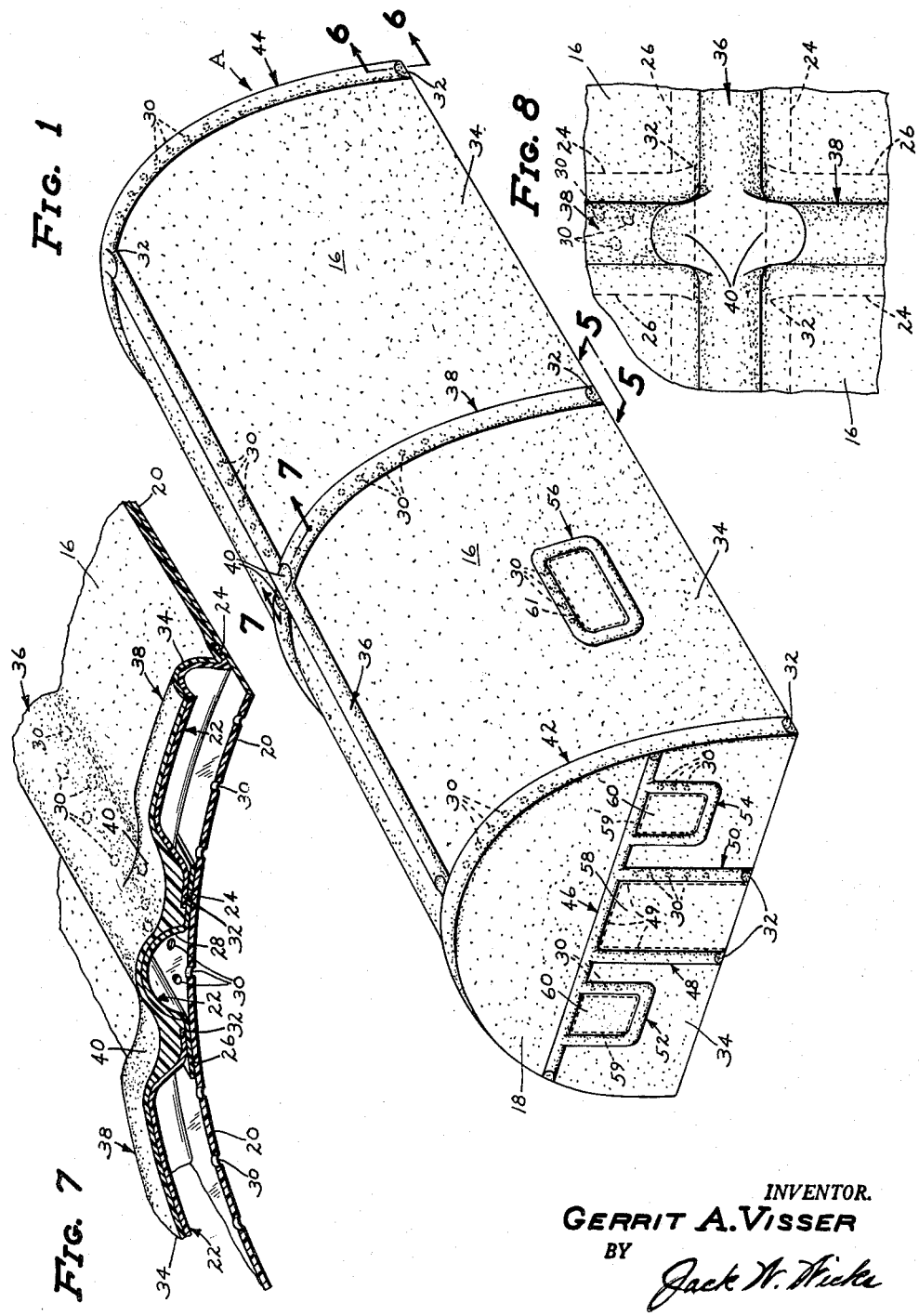
FIGURE 1 is a perspective view of an enclosed structure formed with reinforcement according to the teachings of my invention.

Referring to the drawings in detail, the structure A illustrated in FIGURE 1 includes the combined roof and wall 16 and end walls 18 which are made up of a base form of joined sections of thin material 20, such as polyethylene. The base form is sealed off and then supported into opened condition internally by the introduction of air pressure or other internal support. The base form supported in opened condition is then coated with a self-hardening composition such as fiber-glass which when hardened forms a semi-rigid structure as disclosed in the copending application hereinbefore referred to. We are here concerned with the formation of the structure with reinforcement portions.

Figure 2:
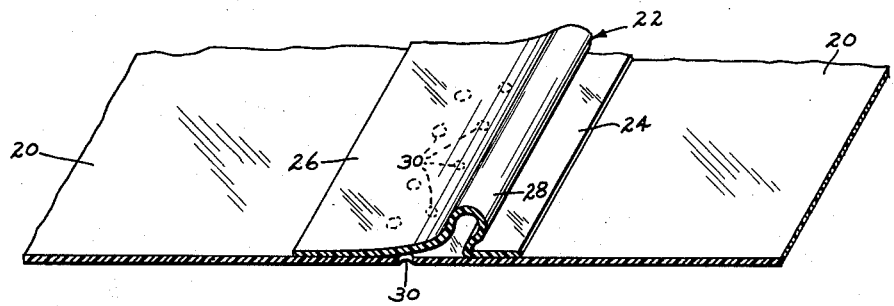
FIGURE 2 is a perspective view of a portion of the base form and reinforcement form member attached thereto in limp form as the first step in the formation of a reinforcement in a structure.
Figure 5:
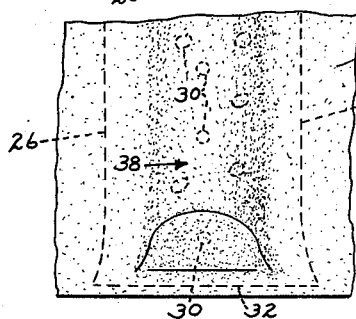
FIGURE 5 is an enlarged fragmentary view on the line 5—5 of FIGURE 1.
Figure 6:
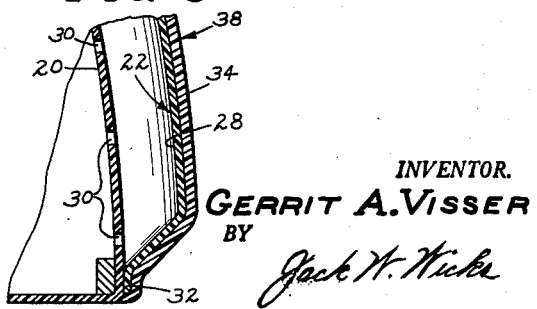
FIGURE 6 is an enlarged sectional view on the line 6—6 of FIGURE 1.

In FIGURE 2 is found a portion of the thin base form material 20 in flat unsupported condition. The numeral 22 designates a member forming the base of the reinforcing rib hereinafter described. The member 22 is made of thin plastic material or the like in flat generally rectangular form. The member 22 is secured to the material 20 at its edges in the narrow areas 24 and 26 thereof extending longitudinally of the member by heat sealing or other conventional means thereby leaving a centrally disposed longitudinally extending unsecured portion 28. Prior to securing the member 22 to the base form material 20, a multiplicity of openings 30 are formed in the material 20 in a more or less aligned position whereby the same will be disposed substantially centrally of the channel portion 28 of the member 22 when in the desired position on the form material 20. The ends of member 22 are then sealed off in a manner similar to that shown at 32 as illustrated in FIGURES 5, 6 and 7, and generally in FIGURES 1 and 8.

Figure 3:
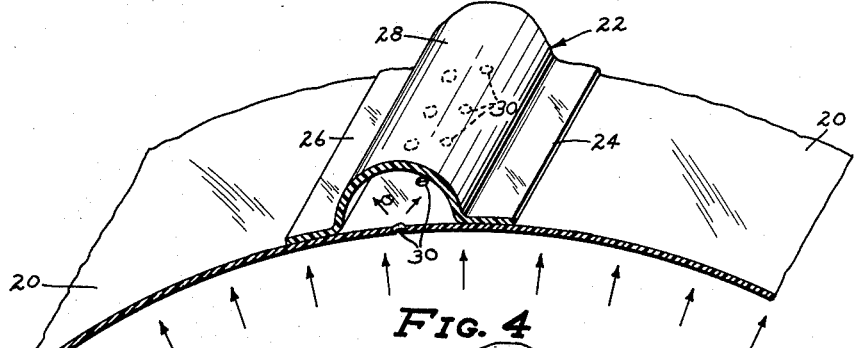
FIGURE 3 is a perspective view of that shown in FIGURE 2 in inflated condition as a further step in the formation of a reinforcement in a structure.

With the member 22 in secure position on the form material 20, the form is then supported into open extended position by air pressure introduced into the form. The air pressure is indicated by the arrows in FIGURE 3. The air introduced into the form and supporting the same passes through the openings 30 and into an enclosed area defined by the member 22. As a result the member 22 is inflated and supported as are all similar members hereinafter referred to and supported into opened position from the position of FIGURE 2 to that shown in FIGURE 3. The supported form material 20 and the member 22 are then coated externally with a self-hardening composition 34 such as fiber-glass. The same may also be coated on the inside. When the self-hardening composition has set into a semi-rigid layer 34 the air pressure is cut off, and we have as a result the channel or reinforcing rib 36 formed simultaneously and integrally, as it were, with the structure made of the base form material 20.

The portion of the material 20 having the holes 30 and extending beneath the finished reinforcement rib 36 may be easily removed, and when so removed electrical wiring, water pipes and heating pipes may be positioned within the recess formed by the rib and then covered over to conceal the same. The reinforcement ribs described may be positioned on the structure so as to be able to place members within the structure where desired.

Figure 4:
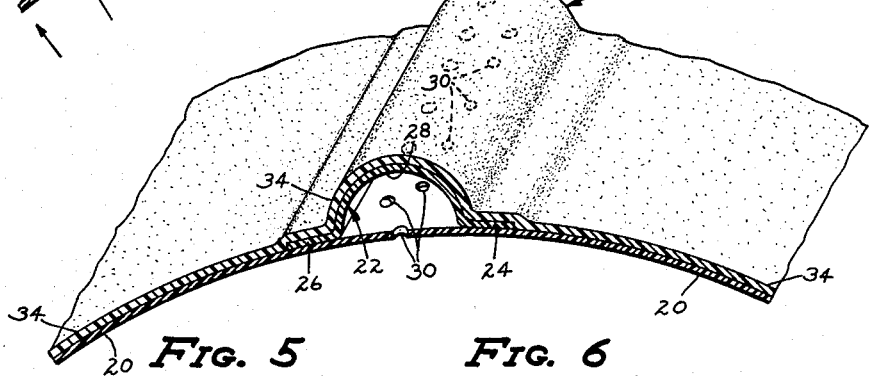
FIGURE 4 is a perspective view of that shown in FIGURE 3 with the rigidifying material in applied hardened condition thereby completing the structure portion and the reinforcement.

The reinforcement rib 36 shown in FIGURE 4 may be considered as the rib running longitudinally of the structure and as a ridge pole all as shown in FIGURE 1. The rib 38 running transversely and centrally in FIGURE 1 is made in the same manner as are other reinforcements hereinafter described. The ribs in FIGURE 7, for example, form the intersection of the rib 36 with the rib 38 and where the latter intersects the former the depression created is filled in with fiber-glass as at 40 to thereby "flow" the ribs 36 and 38 together at the interesection thereof.

The front and rear ribs 42 and 44, respectively, are formed in the same manner as 36 and 38 set out above, and where the outer ends of the rib 36 meet the end ribs 42 and 44 the juncture may be "flowed" in in the manner illustrated in FIGURE 7.

Further provided is the horizontal rib reinforcement 46 formed in the front wall 18 which is formed in the manner heretofore described and sealed at the ends thereof as described and illustrated in FIGURES 5 and 6. Extending downwardly from the horizontal rib reinforcement 46 are the spaced vertical ribs 48 and 50 which are also formed as outlined above. Similarly the U-shaped reinforcement ribs 52 and 54 are formed in the wall 18 and meet up with the rib 46 in the manner heretofore set forth. The substantially rectangular shaped reinforcement rib member 56 is formed in the wall 16 in substantially the same manner as the ribs heretofore described. A saw cut may be made along the inner edges of the ribs 48 and 50 and the inner edge of the rib 46 which lies between the upper ends of the ribs 48 and 50 on the broken line 49 and the piece indicated as 58 removed and installed as a door. The ribs 48 and 50 form reinforced door jambs. Similarly the portion of the wall 18 surrounded by the rib member 52 and a portion of the rib 46 and indicated as 60 may be cut out on the broken line 59, and a window mounted in the opening, the ribs 52 and 46 forming the necessary framing support. The wall portion 16 within the reinforced rib frame member 56 may be removed on the line 61 and a window fit in the reinforced opening.

Reinforced rib members such as 52, 54 and 56 may be formed at a number of points in the structure and only those used that are desired or that fit in with the floor plan within the structure.

In FIGURE 9 is illustrated a cylindrical container B which is made up of a base form formed of a thin material 62 in the shape of that shown. The wall of the container is then formed with series of spaced openings 64 around the circumference thereof. Then a piece of thin material 64 is cut of a length to extend around the circumference of the container B in the form of a band 66. The band piece 66 is secured at its edges in the areas 68 and 70 running longitudinally of the band to the material 62 forming the base form by heat sealing or other conventional means, thereby leaving a centrally disposed longitudinally extending unsecured portion 72 which is centrally disposed over the openings 64. The ends of the based piece 66 are overlapped and sealed as at 74.

With the band piece member 66 in secured position on the form material 62 as shown in detail in FIGURE 11, the base form formed by the thin material 62 is then supported into opened extended position by means of air pressure introduced at the neck portion 76. The air introduced passes through the openings 64 and into an enclosed area defined by the member 66. As a result the member 66 is also inflated and supported into opened position from the position of FIGURE 11 to that shown in FIGURE 12, the air pressure indicated by the small arrows in FIGURE 12. The opened supported form material 62 and the member 66 are then coated externally with a self-hardening composition 78 such as fiber-glass. When the composition has "set" into a semi-rigid layer 78, the air pressure is then cut off, and as a result we have a reinforcing rib 80 formed integrally, as it were, with the base form material 62 and the coating 78 thereon. The reinforcing rib 82 of the container B is made in the same manner as the rib 80.

The openings 64 extend the full width of the area between the secured edges so that no pockets are formed in which liquid could be trapped. With the construction of my openings 64 all liquid therein easily drains therefrom when the container B is emptied. In addition the container B may be any polygonal form in cross section.

The reinforcing ribs are particularly desirable for large size containers or vats, and the rigid reinforcing ribs allow the container to be rolled about horizontally on the same. With the reinforcing ribs to give rigidity to the container a thinner deposit of fiber-glass layer 78 is needed thereby effecting an economy.

In FIGURE 14 is shown an end view of a structure having the end wall 84 which is formed in the manner described with regard to the structure A. The wall 84 has formed thereon the vertical reinforcing ribs 86 and 88 which are connected at the tops thereof by the horizontal reinforcing rib 90, said ribs formed in the manner hereinbefore described. Also formed are the vertical reinforcing ribs 92 and 94 which are in close but spaced parallel relation to the ribs 86 and 88 respectively. The ribs 92 and 94 are connected at the tops thereof by the horizontal rib 96 which is in close but spaced parallel relation to the rib 90. The surface of the wall 84 bounded by the ribs 92, 94 and 96 is further strengthened by the intersecting ribs 98 and 100 and the bottom rib 102. The reinforcing ribs 92, 94 and 96 are formed in the manner described with regard to the structure A. Thus the reinforcing ribs and the wall 84 are all formed in finished form simultaneously with the application of the outer coating of fiber-glass which also simultaneously forms the door member and door jamb mentioned below.

With the ribs formed in the wall 84, a saw cut is made on the broken line 104 between the ribs, and as a result we have a reinforced door member bordered by the ribs 92, 94, 96 and 102 and a reinforced door jamb bordered by the ribs 86, 88 and 90. The door thus formed may be hinged by conventional methods to the jamb formed. It will be noted in FIGURE 15 that the parallel ribs 90 and 96 may be formed of a one piece member 106 secured at its outer edges to the thin base form material 108 and centrally at 110 to the material 108 and then covered with a layer of fiber-glass 112.

In FIGURES 16, 17 and 18 is illustrated a method of forming a structure cylindrical in form such as a culvert or the like. In FIGURE 16 is shown a perspective view of a base form 114 made up of thin material such as polyethylene plastic. The form 114 may be made up of sections of thin material sealed together to make up the form 114 having the closed ends. Air is then introduced into the form through the valve 116 to inflate and support the form as shown in FIGURE 16. The form 114 may then be coated with a self-hardening composition such as fiber-glass and when hardened the internal air pressure is removed and a semi-rigid structure is the result. With the ends of the finished form 114 removed we have a structure that can be used as a culvert, for example.

As a further embodiment of my invention, the inflated plastic form 114 may have positioned thereon the spaced wire rings 116 which compress the form 114 at intervals to form a corrugated formation as illustrated in FIGURES 17 and 18.

The wire rings 116 may be secured in position on the form 114 before the same is inflated. The wired form of FIGURE 17 is then covered with a self-hardening layer 118 of a composition such as fiber-glass and when hardened the air pressure removed. The enclosing ends are removed and the result is a corrugated reinforced cylindrical member usable for a culvert member or the like, a portion of which is shown in section in FIGURE 18.

In FIGURE 19 is illustrated a portion 120 of a thin base form similar to that hereinbefore described and secured to the base form portion is the preformed thin channel-shaped member 122. The form portion 120 and the member 122 are coated with a layer 124 of self-hardening composition such as fiber-glass, and when the layer 124 has set, we have the reinforced form portion 120 particularly as illustrated in FIGURE 20.

In FIGURE 21 is illustrated a portion 126 of a thin base form similar to the hereinbefore described. Secured to the portion 126 is a preformed rib member 128. The rib 128 may be molded for example, of heat expanded polyethylene beads of a mixture of styrene foam or urethane foam mixed with a resin. The form portion 126 and the rib member 128 are coated with a layer 130 of self-hardening composition such as fiber glass. When the layer 130 is hardened, we have the reinforced form portion 126, as particularly illustrated in FIGURE 22. FIGURE 23 illustrates a length of half tubing mold 132 held in a curved position corresponding to the curve of the base form on which a reinforcing rib is to be mounted. A pre-mixed foam is poured or sprayed into the mold member 132, and when the sauce is hardened, we have the resultant formed rib 134 for placement and incorporation with a base form in the manner illustrated in FIGURES 21 and 22.

The invention is not to be understood as restricted to the details set forth since these may be modified within the scope of the appended claims without departing from the spirit and scope of the invention.

Having thus described the invention, what I claim as new and desire to secure by Letters Patent is:

1. The method of making a reinforced semi-rigid structure consisting in forming a thin flexible enclosed base form, then forming a series of openings in the base form, then securing a thin channel-shaped member to the base form over the series of openings to enclose the same, then admitting air under pressure into the base form and the channel-shaped member through the openings whereby the form and the channel-shaped member are supported in extended opened condition, then covering the base form and channel-shaped member with a self-hardening composition to thereby form a semi-rigid structure having a reinforcing channel-shaped rib thereon.

2. The method of making a semi-rigid structure having an opening with reinforced edges consisting in forming an enclosed base form of thin material, then forming a series of small openings in the base form adjacent to the area which will be removed to form the opening, then securing a thin flexible closed channel-shaped member to the base form and over the small openings, then admitting air under pressure into the base form and into the channel-shaped members through the small openings whereby the form and channel-shaped members are supported in extended opened condition, then covering the base form and channel-shaped members with a self-hardening composition to thereby form a semi-rigid structure having a reinforced area formed by the channel-shaped member, then removing that portion of the base form within the inner edges of the channel-shaped members to thereby form an opening having reinforced peripheral edges.

3. The method of making a semi-rigid structure having a reinforced door and door jamb consisting in forming an enclosed base form of thin material, then forming a first line of a series of small openings in the base form in the outline of a door jam desired, then forming a second line of a series of small openings substantially parallel to the first line of openings and spaced therefrom, then securing a channel-shaped member of thin material to the base form over each line of small openings enclosing the openings, then admitting air under pressure into said base form and the channel-shaped members through the openings whereby the base form and the channel members are supported in extended opened condition, then covering the base form and channel-shaped members with a self-hardening composition to thereby form a semi-rigid structure having semi-rigid parallely disposed channel-shaped reinforcing rib members in the outline of a door and jam therefor, then making a cut in the rigidified structure between the parallely disposed rib members to thereby form a reinforced door member and reinforced jamb member therefor.

4. The method of making a reinforcing member on the wall of a structure consisting in forming a series of openings in a structure wall in a formation generally defining the extent of the reinforcing member, then securing a thin flexible channel-shaped member to the structure wall over the openings and enclosing the same, then admitting air under pressure through the openings and into the channel-shaped member to support the same in opened extended position, then covering the channel-shaped member with a self-hardening composition to rigidify the same and form a semi-rigid reinforcing member on the structure.

5. The method of making a semi-rigid structure having a reinforced door and jamb consisting in forming an enclosed base form of thin material, then securing a channel-shaped member of thin material in the outline of a door to the base form, then securing a channel-shaped member of thin material in the outline of a door jamb to the form parallel to and adjacent the channel-shaped member forming the door outline, then admitting air pressure into the base form and the channel-shaped members to hold the same into extended opened condition, then covering the base form and the channel-shaped members with a self-hardening composition to thereby form a semi-rigid construction having semi-rigid parallely disposed channel-shaped reinforcing rib members in the outline of a door and jamb therefor, then making a cut in the rigidified structure between the parallely disposed door and jamb rib members to thereby form a reinforced door member and reinforced jamb member therefor.

References Cited by the Examiner
UNITED STATES PATENTS

| | | | |
|---|---|---|---|
| 1,582,173 | 4/26 | Foster | 50—284 |
| 1,717,444 | 6/29 | Foster | 50—284 |
| 2,270,229 | 1/42 | Neff. | |
| 2,335,300 | 11/43 | Neff | 50—61 |
| 2,365,145 | 12/44 | Neff | 50—52 |
| 2,388,701 | 11/45 | Neff. | |
| 2,413,243 | 12/46 | Neff | 50—18 |
| 2,470,990 | 5/49 | Kennedy | 154—85 |
| 2,593,714 | 4/52 | Robinson. | |
| 2,684,923 | 7/54 | Harrison | 154—85 |
| 2,706,309 | 4/55 | Lampman. | |
| 2,833,682 | 5/58 | De Laszlo. | |
| 2,892,239 | 6/59 | Neff. | |
| 2,901,024 | 8/59 | Marsden | 154—8 |
| 2,917,102 | 12/59 | Mahady | 154—8 |
| 2,936,812 | 5/60 | Roberts | 156—144 |
| 3,028,276 | 4/62 | Roberts et al. | 156—286 |

EARL M. BERGERT, *Primary Examiner*.

HAROLD ANSHER, CARL F. KRAFFT, W. P. MUSHAKE, *Examiners*.